United States Patent
Ahlert et al.

(10) Patent No.: US 7,486,293 B2
(45) Date of Patent: Feb. 3, 2009

(54) METHOD, A SYSTEM AND A COMPUTER PROGRAM FOR SIGNAL DISPLAY

(75) Inventors: Dirk Ahlert, Muehlhausen (DE); Christian Guenther, Mannheim (DE); Ariane Skutela, Karlsruhe (DE); Guido Tesch, Karlsruhe (DE)

(73) Assignee: SAP AG, Walldorf (DE)

( * ) Notice: Subject to any disclaimer, the term of this patent is extended or adjusted under 35 U.S.C. 154(b) by 188 days.

(21) Appl. No.: 10/498,553

(22) PCT Filed: Jan. 6, 2004

(86) PCT No.: PCT/EP2004/000024

§ 371 (c)(1),
(2), (4) Date: Feb. 21, 2006

(87) PCT Pub. No.: WO2004/111814

PCT Pub. Date: Dec. 23, 2004

(65) Prior Publication Data

US 2006/0192773 A1    Aug. 31, 2006

Related U.S. Application Data

(60) Provisional application No. 60/478,635, filed on Jun. 13, 2003.

(51) Int. Cl.
G06T 11/20 (2006.01)

(52) U.S. Cl. .................................. 345/440; 345/204
(58) Field of Classification Search ................ 345/440, 345/204
See application file for complete search history.

(56) References Cited

U.S. PATENT DOCUMENTS 5,583,514 A * 12/1996 Fulop ........................ 342/359

(Continued)

OTHER PUBLICATIONS

Hari Balakrishnan, Venkata N. Padmanabhan, Srinivasan Seshan, Randy H. Katz with title of "A comparison of mechanisms for improving TCP performance over wireless links" Dec. 1997 IEEE/ACM Transactions on Networking (TON), vol. 5 Issue 6.*

(Continued)

Primary Examiner—Kee M Tung
Assistant Examiner—Javid A Amini
(74) Attorney, Agent, or Firm—Finnegan, Henderson, Farabow, Garrett & Dunner, LLP (57) ABSTRACT

A method is provided to display a plurality of signals, on a display screen with an intuitive graphical interface, wherein a user has ability to monitor overall data from a single view. A plurality of signals having different frequencies and remaining in a complex relationship with each other may be visualized. Each signal may be displayed by using a symbol, wherein a quasi static signal is graphically depicted using a limit symbol while the dynamic signals are visualized using bar symbols. The symbols may be arranged horizontally, on multiple image planes, in close proximity to each other. A limit symbol may be positioned on the topmost image plane in such a way that if one bar reaches the limit symbol, the bar symbol is at least partially covered. The spatial relationship among the symbols is such that the user can easily determine if an actual signal output matches planned or scheduled output or if it does not exceed the total available capacity. A plurality of symbols may be allocated to correspond to a plurality of numeric values in such a way that numerical data directly corresponding to the graphical depiction is located in the same horizontal line as the symbols. Additionally, the user may be able to oversee the changes in signal in consecutive time segments.

16 Claims, 6 Drawing Sheets

U.S. PATENT DOCUMENTS

| | | | |
|---|---|---|---|
| 6,424,860 B1* | 7/2002 | Karlsson et al. | 600/512 |
| 2001/0036843 A1* | 11/2001 | Thompson | 455/562 |
| 2003/0156495 A1* | 8/2003 | Haase et al. | 367/119 |
| 2004/0236547 A1* | 11/2004 | Rappaport et al. | 703/2 |
| 2005/0251440 A1* | 11/2005 | Bednarek | 705/10 |
| 2006/0095360 A1* | 5/2006 | Apple et al. | 705/35 |
| 2007/0067128 A1* | 3/2007 | Vock et al. | 702/94 |
| 2007/0217576 A1* | 9/2007 | Blair | 379/1.01 |

OTHER PUBLICATIONS

Diane Tang, Mary Baker with title of "Analysis of a metropolitan-area wireless network" Mar. 2002, Wireless Networks, vol. 8 Issue 2/3.*

Fairness and Scheduling: Ordered packet scheduling in wireless ad hoc networks: mechanisms and performance analysis V. Kanodia, A. Sabharwal, B. Sadeghi, E. Knightly Jun. 2002 Proceedings of the 3rd ACM international symposium on Mobile ad hoc networking & computing MobiHoc '02 Publisher: ACM Press.*

Wireless Local Area Networks: Analysis of a campus-wide wireless network David Kotz, Kobby Essien Sep. 2002 Proceedings of the 8th annual international conference on Mobile computing and networking MobiCom '02 Publisher: ACM Press.*

Notification Concerning Transmittal of International Preliminary Report on Patentability (Chapter 1 of the Patent Cooperation Treaty), Mar. 20, 2008.

* cited by examiner

METHOD, A SYSTEM AND A COMPUTER PROGRAM FOR SIGNAL DISPLAY

This application is a national stage filing under 35 U.S.C. § 371 of International Application No. PCT/EP04/00024, filed Jan. 6, 2004, claiming the benefit of U.S. Provisional Application 60/478,635 filed Jun. 13, 2003, the contents of which are herein incorporated by reference.

TECHNICAL FIELD

The present invention relates in general to the field of data display and, in particular, to methods for displaying a plurality of signals having different frequencies.

BACKGROUND

The increasing availability of large amounts of complex data requires development of methods that would allow a user to deal effectively with the available information. A common problem faced by the user is information overload. Graphical depictions of computer-generated data aid users in their analysis and understanding of data. Graphical representation of data provides also an insight into important characteristics of the data.

However, when illustrating these data characteristics, many of graphical display methods of the prior art introduce data clutter into the graphical data displays. As a result, a demand exists for a computer display technique applicable to a very wide range of fields that would be intuitive and clutter-free.

An important issue associated with computer based graphical systems exists regarding the necessity of carefully managing the display screen space. Since it is difficult to display plurality of values and the relationships these values have towards each other in a limited display space, it is of paramount importance to design a display system that would efficiently use this valuable resource. Additionally, the underlying data tends to be comprehensive and complex. In many systems, simple additions or changes to data require extensive and time-consuming navigation and editing of data across a multitude of display screens; a visual inspection of the data requires as well, the same navigation of multiple display screens. Many types of software applications can display data in charts with multiple bars, however, they do not provide an intuitive overview of data from a single view.

Accordingly, there is a need for an easy-to-use display system with an intuitive graphical interface that overcomes the many drawbacks of the prior existing methods and systems.

SUMMARY

The present invention addresses the above-mentioned problems of the prior art, and provides a computer-implemented system and a method for graphically displaying a plurality of data values representing signals having different frequencies.

A method of displaying a set of signals is disclosed wherein at least four signals are displayed on a display screen, the signals having different frequencies, one of the signals having a frequency being substantially below the frequencies of the other signals. A limit symbol representative of one of the signals is displayed on a topmost image plane and bar symbols representative of the other signals are displayed on at least a second image plane.

The image planes are superimposed on each other. The bar symbols are positioned in proximity to each other and the limit symbol is positioned in such a way that if one of the bar symbols reaches the limit symbol, the bar symbol is at least partially covered by the limit symbol. The limit symbol and the bar symbols constitute a first symbol group, wherein the display of the first symbol group is permanently fixed at the end of a first time interval and a second symbol group is displayed comprising the limit symbol and the bar symbols for a second time interval.

In accordance with one embodiment of the invention, the limit symbol represents a quasi static signal and the bar symbols represent dynamic signals. A limit symbol is located on the topmost image plane. All the bar symbols are positioned, in this embodiment, on the second image plane, with the bar symbol representing the most dynamic signal, positioned in a center and the remaining bar symbols positioned on the sides of the bar symbol representing the most dynamic signal. All the bar symbols positioned on the second image plane are oriented horizontally. The center bar symbol representing the signal of the set of signals with the highest frequency and the other bar symbols representing signals of lesser frequencies are adjacent to the center bar. The distribution of the gray value remains in direct proportion to the respective frequencies represented by the bar symbols. Thus, the center bar symbol representing the most dynamic signal has also the highest gray value. The adjacent bar symbols have lower gray values since they have also lower frequency. The numerical, tabular data, corresponding to actual signal values of the set of signals is displayed in the same horizontal line as the limit symbol and the bar symbol.

In accordance with a further embodiment of the present invention the first, topmost image plane includes a limit symbol representative of a quasi static signal. A bar symbol representative of the signal having the highest frequency is displayed on the second image plane, located beneath the topmost image plane. The bar symbol positioned on the second image plane has the lowest gray value of the group of bar symbols. In this embodiment the gray value of the bar symbols is inversely proportional to their respective frequencies. The third image plane includes bar symbol representing less dynamic signal than the bar symbol positioned on the second image plane, having also higher gray value than the bar symbol representing the most dynamic signal. The fourth, lowermost image plane includes bar symbol representing the least dynamic signal out of the group of symbols, it is also the widest one out the group and it is characterized by the fact that it is an empty frame, in order to better show the contrast between the lowermost bar symbol and the other symbols.

The present invention may be thus applicable to a wide range of fields, with the particular emphasis on technical fields, including a variety of industrial control processes, engine monitoring, diagnosis systems, engine control or logistics, as well as business and financial data environments. It may provide a quick, intuitive way for a user to monitor, assign and evaluate comprehensive and complex information in a single display view.

In particular, the invention may be applicable in the field of computer workstations with a graphical display. The user may interact with the display with standard input devices such as a keyboard and a mouse. One advantage of the present invention is that it may provide a means to efficiently manage screen space in this type of application, thus saving the user considerable time and effort.

DETAILED DESCRIPTION

Figure 1:
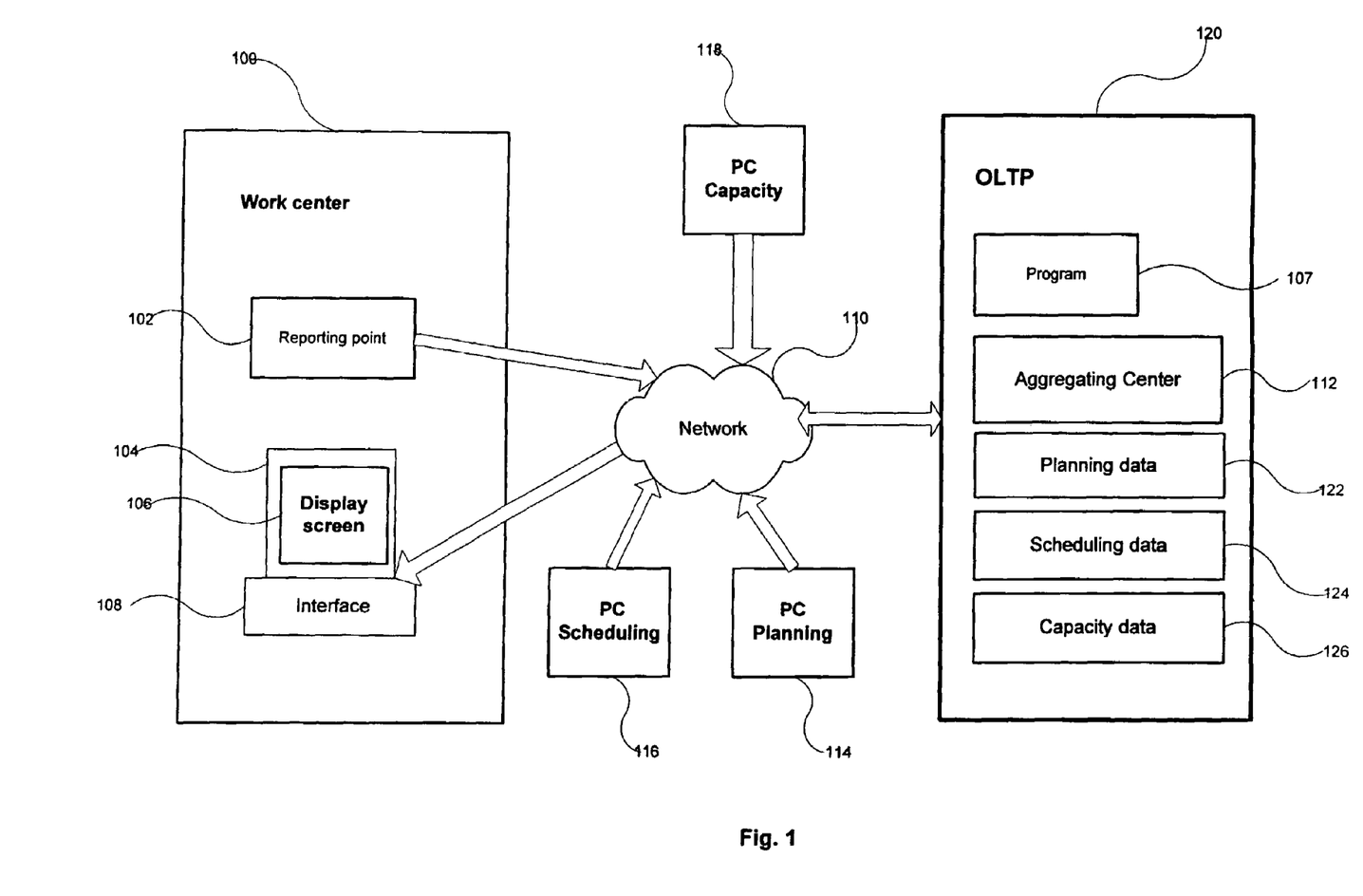
FIG. 1 is a block diagram illustrating components of a graphical data display system consistent with the present invention.

FIG. 1 is a block diagram schematically illustrating a graphical data display system consistent with the present invention. The system may include multiple client computers (104;114-118), which are connected to Online Transaction Processing (OLTP) 120 which may comprise data related to planning 122, scheduling 124 and capacity limitations 126, as well as program 107 that aggregates values for the aggregating center 112. In this exemplary embodiment, the display computer 104 is located in the work center 100 and it comprises display screen 106. The user interacts with the display computer through the interface 108. The client computers communicate with each other through a network 110.

The network 110 can be any network, such as a local area network, a wide area network, or the Internet. Each one of the client computers includes one or more processors and in this preferred embodiment they represent the work stations where planning 114, scheduling 116, capacity determination 118 and visualizing of actual graphical data 104 is performed. Data is collected at a reporting point 102, where it can be entered manually; however, it can be also inputted by using any type of a device, such as for example a scanner reading the bar code information; additionally, the collected data can be obtained fully automatically, as for example, by monitoring equipment. The data values can include any type of data, such as qualitative or quantitative data, and the obtained data can comprise any measurable or derived values.

Data collected at a reporting point located in one or several work centers is transferred to OLTP where data is first stored and then aggregated for the future processing. Data may be stored in, for example, a computer-readable storage medium. The users at the work stations designated for planning, scheduling, and capacity determination for data output, communicate with each other over the network and determine the target values for the planned and scheduled output, as well as the available capacity.

The determination of the plan for output and the negotiations about the output scheduling between different work centers can take place automatically, as well as they can be performed manually. Agreed upon data is then transferred to the exemplary client computer designated for graphic data display. Thus, in one embodiment, the complex and comprehensive data coming from plurality of work centers can be easily evaluated and compared on a single display screen, where the user has overview of planned and scheduled output, as well as the capacity limitations and the actual outcome, all presented side-by-side in the graphical from and supported by numerical values appearing in the same horizontal line as the graphical symbols.

The present invention may be particularly useful in any applications where at least four different values need to be compared which remain with each other in a complex relationship and where the necessary data is coming from plurality of the remote work centers or other data sources. As a result, the disclosed computer display technique may be applicable to a wide range of fields.

Figure 2:
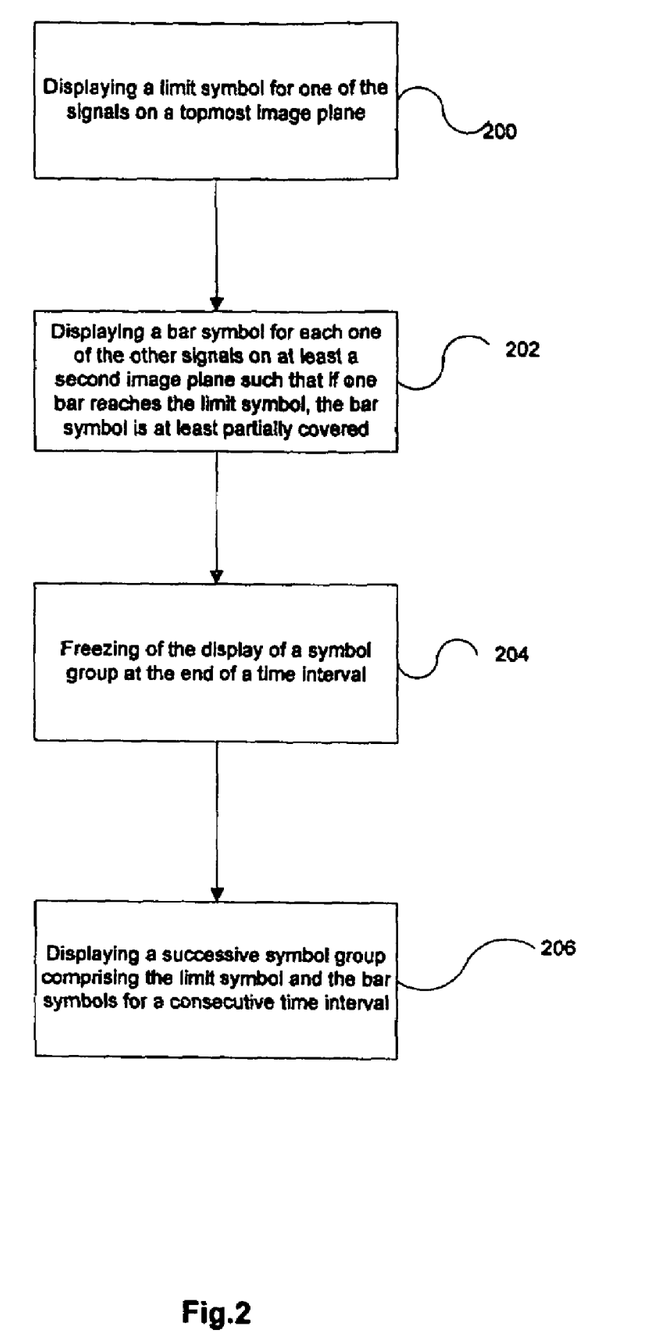
FIG. 2 is a flowchart of a process describing a method consistent with the present invention.

FIG. 2 provides a flow diagram illustrating an exemplary process of creating a graphical data display for at least four signals, the signals having different frequencies and one of the signals having a frequency being substantially below the frequencies of the others. In step 200, a limit symbol for one of the signals is displayed on a topmost image plane, the signal being a quasi static signal. In step 202, a bar symbol is displayed for each one of the other signals on at least a second image plane, wherein the other signals include a plurality of dynamic signals.

In one embodiment all bar symbols are located on the same image plane next to each other such that they are substantially non-overlapping. In another embodiment there is a separate image plane for each bar symbol; in this instance the limit symbol is still located on the topmost image plane, however, the most dynamic signal is represented by a bar symbol positioned on the image plane positioned directly underneath the topmost image plane and the less dynamic signals are represented by bar symbols on lower image planes. The assignment of bar symbols to lower image planes is such that the lower the signal frequency the lower the level of the image plane.

In either case, the bar symbols are positioned in proximity to each other in such a way that if one bar reaches the limit symbol, the bar symbol is at least partially covered by the limit symbol.

In step 204, the display of a group of the symbols is addressed. The group comprising the limit symbol, representative of the quasi static signal and the bar symbols representative of the dynamic signals becomes frozen at the end of a time interval of observation. In the last step 206, a successive group of symbols for a consecutive time interval is displayed underneath the previous group of symbols, in such a way that a set of consecutive groups forms a column. Such a structure of the graphical display area allows the user monitoring of successive time segments since the displayed values form the chronological history of the planned, scheduled and measured output and its relation to an available capacity.

Figure 3:
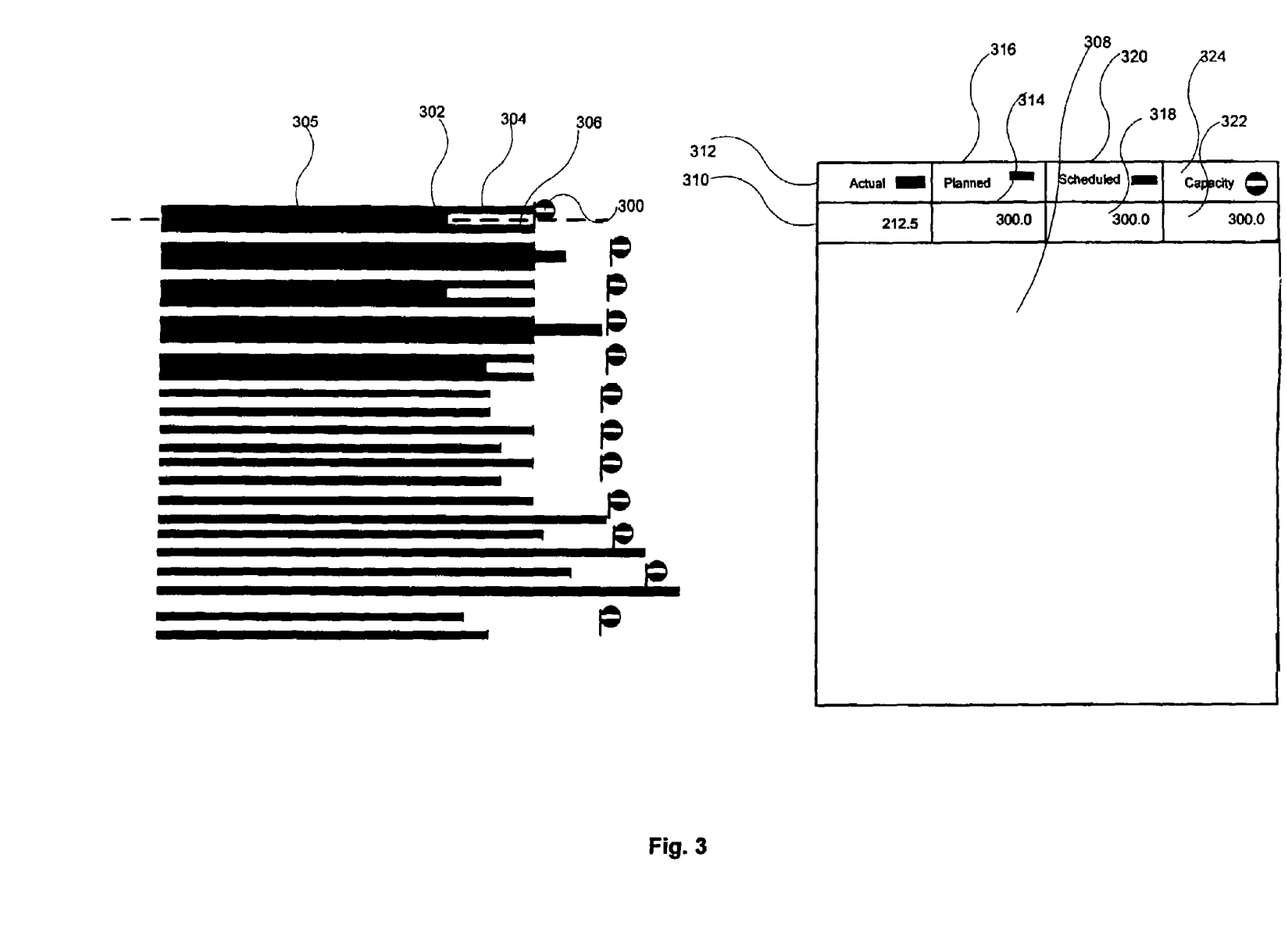
FIG. 3 is an embodiment of a graphical data display showing a set of signals comprising four signals, wherein a limit symbol represents a quasi static signal and bar symbols of the same width represent the dynamic signals consistent with the present invention.

FIG. 3 is an embodiment of a graphical data display showing a set of signals comprising four signals, wherein a limit symbol represents a quasi static signal and bar symbols of the same width represent the dynamic signals. Graphical area of the display screen comprises elongated bars, oriented horizontally, positioned in proximity to each other and extending to the right, designed to represent the measured value of the signals. The signals have different frequencies, one of the signals having a frequency being substantially below the frequencies of the others.

The image plane concept used in the present embodiment facilitates a visualization of three-dimensional objects in a two-dimensional representation. The image plane can be described as a surface comprising a visual content. Those surfaces are arranged in a multiple layer structure, wherein the topmost layer can be fully visible to the user and the layers that are positioned beneath the top layer are at least partially covered by the topmost layer. In the present embodiment, the two image planes are superimposed on each other in such a way that the limit symbol positioned on the topmost image plane will at least partially cover one of the bar symbols positioned on the second image plane if any of the bar symbols reaches the limit symbol. The size of the image plane conforms to the size of the standard display monitor.

A limit symbol 300, representative of one of the signals is displayed on a first image plane, in a form of the red circle with the white stripe inside. A bar symbol for each one of the other signals 302 to 306 is displayed on a second image plane. The limit symbol 300 and the bar symbols 302 to 306 constitute a group of symbols, wherein one of the bar symbols is a center bar symbol 302 positioned on a center line 305 of the group. The display of the entire symbol group is frozen at the end of a predetermined time interval. Term "frozen" means that the display of the group of symbols is fixed and not changeable at the end of a predetermined time interval.

A successive symbol group comprising the limit symbol and the bar symbols is then displayed for a next time interval until all the symbol groups are displayed for the predetermined time intervals requested by the user, for example data can be displayed for the consecutive twelve months.

Bars represent dynamic values of the measured signals and are positioned in respect to limit symbol, representing a quasi static value, in such a way that if one bar reaches the limit symbol which is positioned on the topmost plane, the bar symbol is at least partially covered by the limit symbol. The center bar symbol 302 positioned on a center line 305 of the group is positioned on the second image plane, located directly beneath the topmost image plane comprising the limit symbol. The said bar symbol 302 represents in this embodiment the most dynamic signal and it is positioned in respect to the other bar symbols, representing less dynamic values, in such a way that the display structure reminds of a "thermometer like" display. The less dynamic bar 304 positioned on the same image plane but on the upper side of the display represents planned output comprising shaded rectangular area framed by the top-side line. The bar 306 positioned also on the same image plane but on the lower side of the display represents scheduled output comprising shaded rectangular area framed by the bottom-side line. The distribution of the gray value remains in direct proportion to the respective frequencies represented by bar symbols. Thus, the center bar symbol 302 representing the most dynamic signal has also the highest gray value. In this example, the center bar symbol is dark blue in color, however, in a practical implementation, the user may chose any contrasting color that would be designated as appropriate for the analysis of data. The respective bar symbols 304 and 306 having lower frequency have also lower gray values. In this particular example, they both are of a light blue color what in turn allows for a good contrast with the center bar symbol.

The present invention may allow a user to effectively use the fact that distribution of the gray value remains in direct proportion with the frequency. The specific color coding applied in such a way that a color gradient changes from the center bar to other bars, wherein the center bar symbol has a higher gray value in respect to other bar symbols having considerably lower gray value corresponding to their lower frequencies, provides quick, intuitive way to analyze the signals on the basis of the observed image. Thus, the faster analysis and decision making and associated time savings in comparison, with the numerical data only or the graphical display of the prior art may provide one of the advantages of the present invention. Also the achieved superior contrast may make the present invention equally clear to read for the users having color displays as for those in possession of black and white screens.

The area containing numerical data remains in a close relationship to the graphical depiction, where numerical values area 308 is positioned in the vicinity of the graphical image in such a way that numerical values are displayed in the same horizontal line as bar symbols. For example, tabular cell 310 containing the value of 212.5 describes numerically the actual output 312 also depicted graphically by the corresponding bar 302. The next cell 314 containing the numerical value 300.0 describes planned output 316 and corresponds to the bar symbol 304 comprising shaded rectangular area framed by the top side line. The cell 318 with the numerical value 300.0 representing the scheduled output 320 is also depicted by the bar symbol 306 comprising a shaded rectangular area framed by the bottom side line that describes the scheduled output graphically. Finally, the last cell 322 in this embodiment, containing the value of 300.0, describes the available capacity represented in detail by the same value as the limit symbol 300.

Such presentation of the numerical values assists the user to correlate values with the graphical image, especially in the case where the detailed information is needed. A legend containing cells 312, 316, 320, and 324 which allow this immediate association of numerical data with the graphical image is located directly above the area containing the numerical values.

The above described structure is duplicated, allowing the monitoring of the successive time periods in a predetermined sequence chosen by the user. Thus, not only the historical perspective for the monitored signal is available but also the planned values are presented in one single view.

Figure 4:
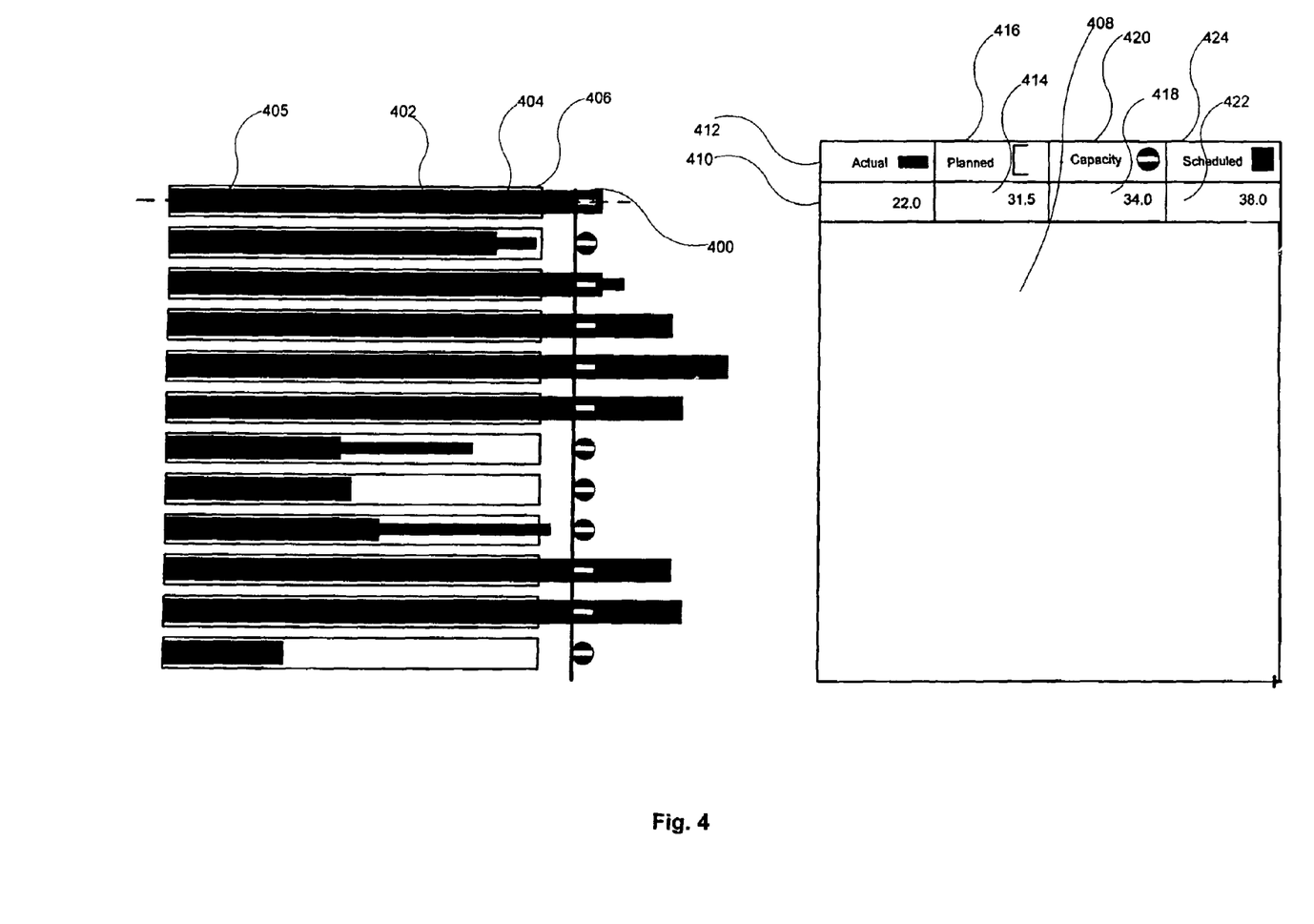
FIG. 4 is another embodiment of a graphical data display showing a set of signals comprising four signals, wherein a limit symbol represents a quasi static signal and bar symbols of different width represent the dynamic signals consistent with the present invention.

FIG. 4 is another embodiment of a graphical data display showing a set of signals comprising four signals, wherein a limit symbol 400 represents a quasi static signal and bar symbols of different widths 402 to 406 represent the dynamic signals. Graphical area of the display screen comprises elongated bars oriented horizontally positioned in proximity to each other and extending to the right, designed to represent the measured value of the signals. The signals have different frequencies, one of the signals having a frequency being substantially below the frequencies of the others.

The image plane concept used in the present embodiment facilitates a visualization of three-dimensional objects in a two-dimensional representation. The image plane can be described as a surface comprising a visual content. Those surfaces are arranged in a multiple layer structure, wherein the topmost layer can be fully visible to the user and the layers that are positioned beneath the top layer are at least partially covered by the topmost layer.

In the present embodiment, the four image planes are superimposed on each other in such a way that the limit symbol positioned on the topmost image plane will at least partially cover one of the bar symbols positioned on any of the image planes if any of the bar symbols reaches the limit symbol. The size of the image plane conforms to the size of the standard display monitor.

A limit symbol 400 representative of one of the signals is displayed on a topmost image plane. In this particular example a limit symbol has a form of a red circle with the diagonal white strip inside. A light blue bar symbol 402 representative of the signal having the highest frequency is displayed on a second image plane, located beneath the topmost image plane. The dark blue bar symbol 404 representing the signal of the lower frequency than the bar symbol representing the most dynamic signal is displayed on the third image plane. Finally, the empty bar symbol 406 representative of the signal having the lowest frequency out of the all signals represented by the bar symbols, is displayed on a fourth image plane. Additionally, the limit symbol 400 and the bar symbols 402 to 406 form a group of symbols. One of the bar symbols is a center bar symbol 402 positioned on a center line 405 of the group. The display of the entire symbol group is frozen at the end of a predetermined time interval. A successive symbol group comprising the limit symbol and the bar symbols is then displayed for a next time interval until all the symbol groups are displayed for the predetermined time intervals requested by the user, for example data can be displayed for the consecutive twelve months.

Bar symbols represent dynamic values of the measured signals and are positioned in respect to limit symbol, representing a quasi static value, in such a way that if one bar symbol reaches the limit symbol, the bar symbol is at least partially covered by the limit symbol. The bar symbol 402 is the thinnest and it represents the most dynamic signal, it has the lowest gray value of the entire group of bar symbols (light blue color) such that its gray value is inversely proportional to its frequency. Next dark blue bar symbol 404, representing less dynamic signal is thicker than the bar symbol representing the most dynamic signal and it is positioned on the third image plane, it has the gray value higher than the thinnest bar symbol 402 representing the most dynamic signal. The lowermost bar symbol 406, representing the least dynamic signal out of the group of symbols, it is also the widest one out the group and it is characterized by the fact that it is empty inside, in order to better show the contrast between the lowermost bar symbol and the other symbols.

Thus, when the gray values of the center bar symbol 402 and the adjacent bar symbols 404 and 406 are compared, it can be observed that color characteristic of the bar symbols are of a contrasting nature. This contrast similarly like it is in the other embodiment of the present invention, provides quick, intuitive way to analyze the signals on the basis of the observed image.

Additionally, the data acquired for the successive time periods can be further monitored by repeating of the structure of grouping of symbols 400 to 406 in a predetermined sequence chosen by the user. Thus, not only the historical perspective for the monitored signal is available but also the planned values are presented in one single overview.

The area containing numerical data 408 that corresponds directly to the displayed graphical depiction, is positioned in the vicinity of the graphical image in such a way that numerical values are displayed in the same horizontal line as superimposed bar symbols. For example, tabular cell 410 containing the value of 22.0 describes numerically the actual output 412 also depicted graphically by the corresponding bar 402. The next cell 414 containing the numerical value 31.5 describes planned output 416 and corresponds to the empty bar symbol 406. The cell 418 with the numerical value 34.0 describing the available capacity 420, represents in detail the same value as the limit symbol 400 representative of one of the signals. Finally, the last cell in this embodiment 422, containing the value of 38.0, describes the scheduled output 424 which is also depicted by the wider bar 404 describing the scheduled output graphically.

Such presentation of the numerical values assists the user to correlate values with the graphical image, especially in the case where the detailed information is needed. A legend containing cells 412, 416, 420, and 424 which allow this immediate association of numerical data with the graphical image is located directly above the area containing the numerical values.

Figure 5:
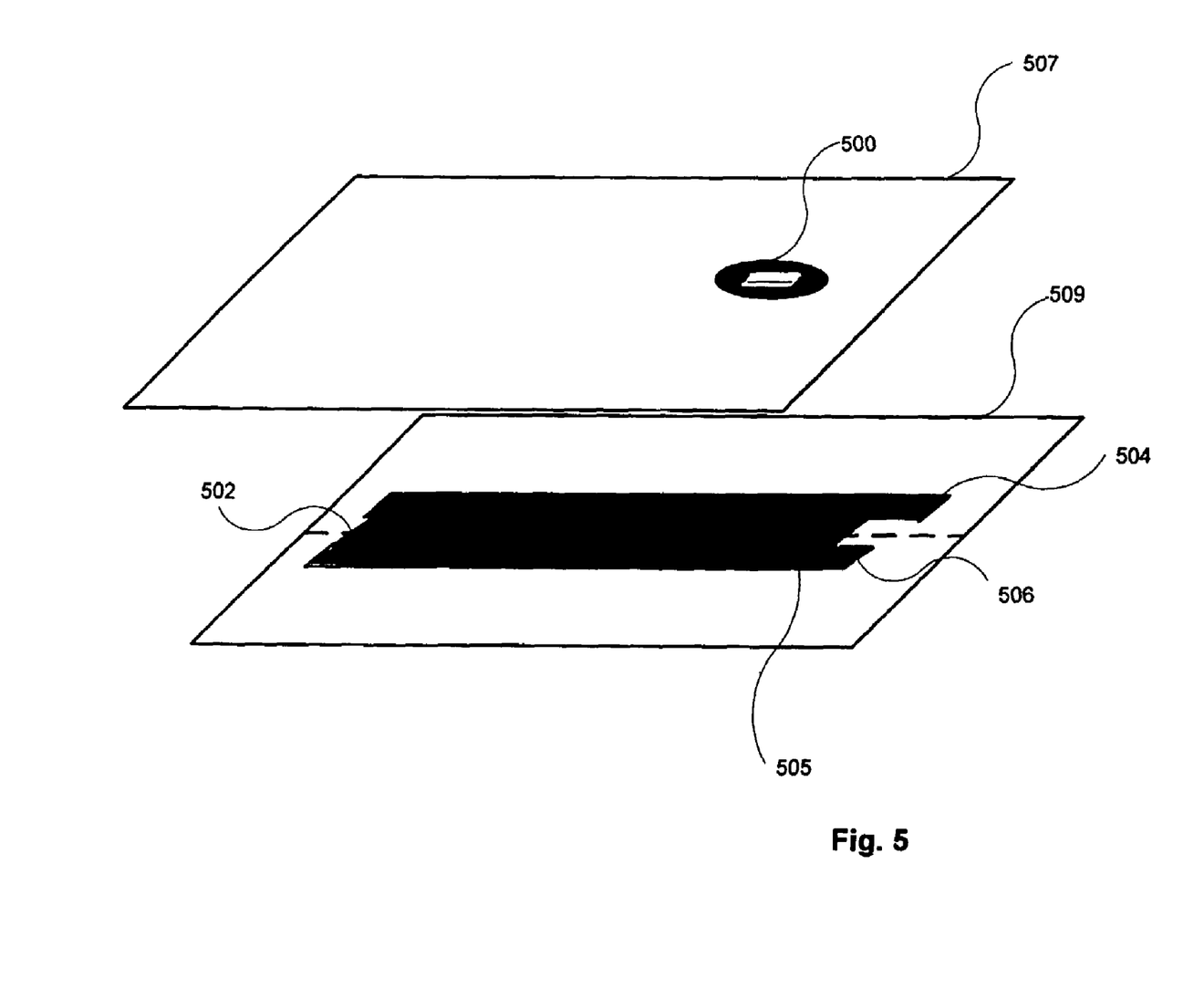
FIG. 5 is a schematic side view of an embodiment of a graphical data display showing the image planes and the symbols assigned consistent with the present invention.

FIG. 5 is a schematic side view of an embodiment of a graphical data display showing the two image planes and the symbols assigned. A red limit symbol 500 representative of one of the signals is displayed on a topmost image plane 507. The second image plane 509, positioned underneath the topmost image plane contains three bar symbols in an arrangement that can be best described as a "thermometer like" display with the dark blue center bar symbol 502 positioned in a middle and two light blue bar symbols 504, 506 positioned on the sides of the central bar symbol 502. The center bar symbol 502 positioned on a center line 505 of the group represents in this embodiment the most dynamic signal and it is adjacent to the other bar symbols, representing less dynamic values.

The less dynamic bar 504 positioned on the side of the center bar symbol represents planned output comprising shaded rectangular area framed by the top-side line. The bar symbol 506 positioned also on the same image plane but on the other side of the center bar symbol represents scheduled output comprising shaded rectangular area framed by the bottom-side line. The distribution of the gray value remains in direct proportion to the respective frequencies represented by the bar symbols. Thus, the center bar symbol 502 representing the most dynamic signal has also the highest gray value. The respective bar symbols 504 and 506 having lower frequency, have also lower gray values.

Figure 6:
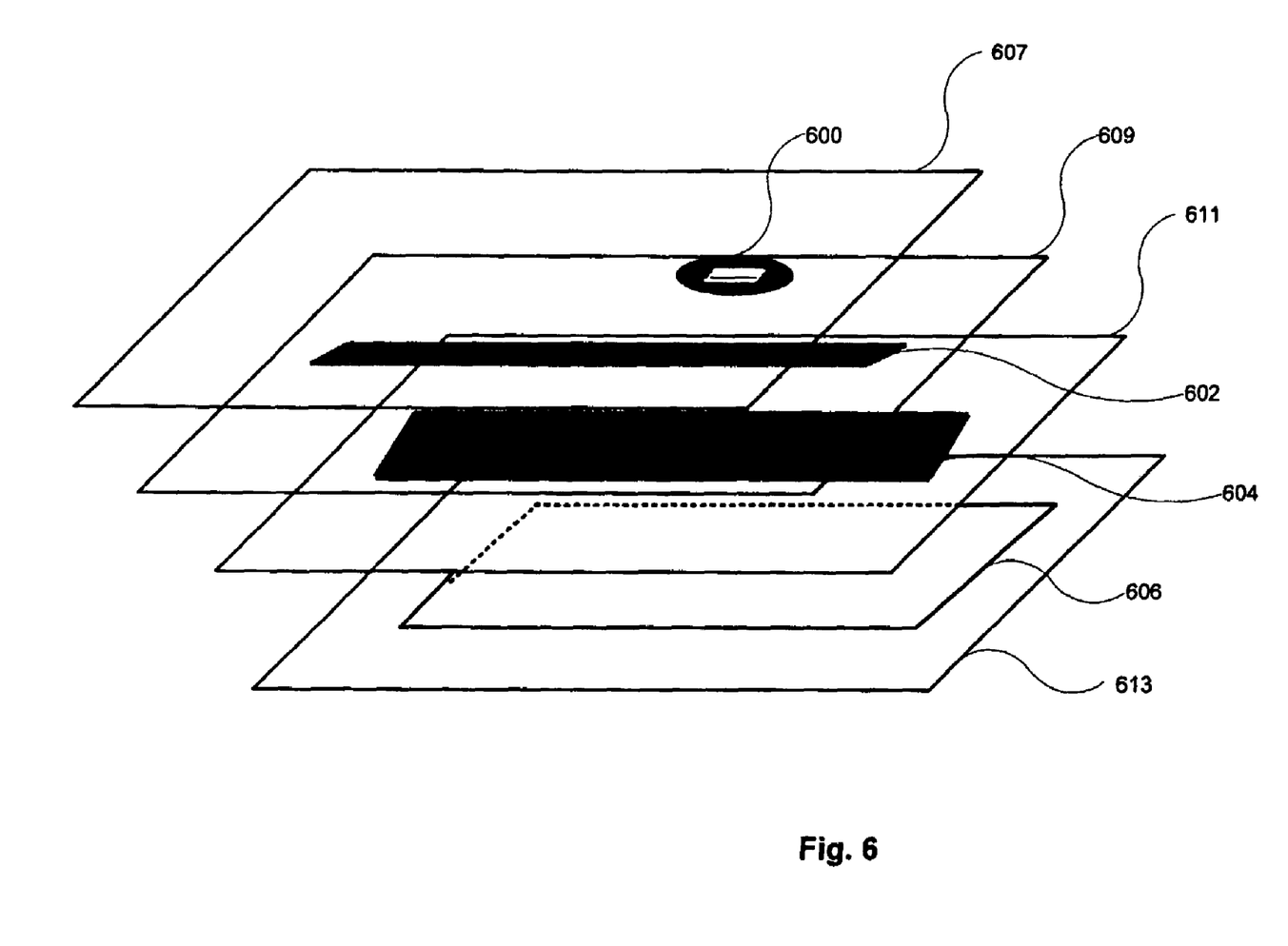
FIG. 6 is a schematic side view of another embodiment of a graphical data display showing the image planes and the symbols consistent with the present invention.

FIG. 6 is a schematic side view of an embodiment of a graphical data display showing the four image planes and the symbols assigned. The first, topmost image plane 607 of this embodiment includes a red limit symbol 600 representative of a quasi static signal. A light blue bar symbol 602 representative of the signal having the highest frequency is displayed on the second image plane 609, located beneath the topmost image plane 607. The bar symbol 602 positioned on the second image plane has the lowest gray value of the entire group of bar symbols such that its gray value is inversely proportional to its frequency.

The third image plane 611 includes dark blue bar symbol 604, representing less dynamic signal than the bar symbol 602, the bar symbol 604 is thicker and it has the gray value higher than the thinnest bar symbol 602 representing the most dynamic signal. The fourth, lowermost image plane 613 includes bar symbol 606, representing the least dynamic signal out of the group of symbols, it is also the widest one out the group and it is characterized by the fact that it is empty inside, in order to better show the contrast between the lowermost bar symbol and the other symbols.

LIST OF REFERENCE NUMERALS

100 Work center
102 Reporting point
104 Display computer
106 Display screen
107 Program
108 Interface
110 Network
112 Aggregating center
114 Computer dedicated for planning
116 Computer dedicated for scheduling 118 Computer dedicated for capacity determination
120 Online Transaction Processing System
122 Planning data
124 Scheduling data
126 Capacity data
300 Limit symbol
302 The most dynamic bar symbol
304 Bar positioned above the most dynamic bar representing planned output
305 Central line
306 Bar positioned beneath the most dynamic bar representing scheduled output
308 Numerical values area
310 The first, exemplary tabular cell
312 Actual output (Legend)
314 The second, exemplary tabular cell
316 Planned output (Legend)
318 The third exemplary tabular cell
320 Scheduled output
322 The fourth, exemplary tabular cell
324 The available Capacity
400 Limit symbol
402 The most dynamic bar symbol
404 Bar positioned beneath the most dynamic bar symbol representing scheduled output
405 Central line
406 The least dynamic bar symbol representing planned output
408 Numerical values area
410 The first, exemplary tabular cell
412 Actual output (Legend)
414 The second, exemplary tabular cell
416 Planned output (Legend)
418 The third exemplary tabular cell
420 Available capacity
422 The fourth, exemplary tabular cell
424 The Scheduled output
500 Limit symbol
502 The most dynamic bar symbol
504 Bar positioned beneath the most dynamic bar symbol
505 Central line
506 The least dynamic bar symbol
507 First image plane
509 Second image plane
600 Limit symbol
602 The most dynamic bar symbol
604 Bar positioned beneath the most dynamic bar symbol
606 The least dynamic bar symbol
607 First image plane
609 Second image plane
611 Third image plane
613 Fourth image plane

The invention claimed is:

1. A method of displaying a set of signals comprising at least four signals on a display screen, the signals having different frequencies, one of the signals having a frequency being substantially below the frequencies of the other signals, the method comprising:
   displaying of a limit symbol on a first image plane representative of the one of the signals that has the frequency being substantially below the frequencies of the other signals; and
   displaying of a bar symbol for each one of the other signals on at least a second image plane, the first and second image planes being superimposed on each other, wherein the limit symbol is positioned in such a way that if one of the bar symbols reaches the limit symbol, the limit symbol positioned on a topmost image plane will at least partially cover one of the bar symbols positioned on the second image plane, and wherein the gray values or colors of the bar symbols correspond to the frequencies of the signals that are represented by the respective bar symbols.

2. The method of claim 1, wherein the limit symbol and the bar symbols constitute a first symbol group, the method further comprising:
   freezing of the display of the first symbol group at the end of a first time interval; and
   displaying a second symbol group comprising the limit symbol and the bar symbols for a second time interval.

3. The method of claim 1, wherein the first image plane is the top plane.

4. The method of claim 1, wherein the limit symbol represents a quasi static signal and wherein the bar symbols represent dynamic signals.

5. The method of claim 2, wherein one of the bar symbols is a center bar symbol positioned on a center line of its group.

6. The method of claim 1, wherein the bar symbols are oriented horizontally, aligned with the center bar symbol representing the signal of the set of signals with the highest frequency and the other bar symbols representing signals of lesser frequency are adjacent to the center bar.

7. The method of claim 1, wherein the image planes are superimposed on each other and wherein the gray values or the colors are chosen in proportion to the signal frequencies or inversely proportional to the signal frequencies.

8. The method of claim 1, wherein numerical tabular data, corresponding to actual signal values of the set of signals, is displayed in the same horizontal line as the limit symbol and the bar symbols.

9. The method of claim 1, wherein the limit symbol representative of one of the signals is displayed on the first image plane and the bar symbols representative of other signals are displayed on the second image plane with the center bar symbol positioned on the center line and the other bar symbols aligned horizontally along the center line.

10. The method of claim 1, wherein the limit symbol representative of one of the signals is displayed on the first image plane, the bar symbol representative of the signal with the highest frequency is displayed on the second image plane, the bar symbol representative of the signal with the lower frequency than the bar symbol positioned on the second image plane is displayed on the third image plane and the bar symbol representative of the signal with the lowest frequency value out of the set of signals is displayed on the fourth image plane.

11. The method of claim 1, wherein the center bar symbol has the highest gray value and the other bar symbols have lower gray values in proportion to the respective frequencies of the signals that are represented.

12. The method of claim 1, wherein the center bar symbol has a gray value that is inversely proportional to the frequency of the signal that it represents and the other bar symbols have gray values in proportion to their respective frequencies.

13. A system of displaying a set of signals comprising at least four signals on a display screen, the signals having different frequencies, one of the signals having a frequency being substantially below the frequencies of the other signals, the system comprising:
   a) means for displaying of a limit symbol on a first image plane representative of one of the signals; and
   b) means for displaying of a bar symbol for each one of the other signals on at least a second image plane, the first and second image planes being superimposed on each other, wherein the limit symbol is positioned in such a way that if one of the bar symbols reaches the limit symbol, the limit symbol positioned on a topmost image plane will at least partially cover one of the bar symbols positioned on the second image plane.

14. The system of claim 13, wherein a display of signals is generated based on data retrieved from a plurality of data sources.

15. The system of claim 13, wherein numerical tabular data, corresponding to actual signal values of the set of signals, is displayed in the same horizontal line as the limit symbol and the bar symbols.

16. A computer-readable storage medium comprising instructions for displaying a set of signals, comprising:

displaying of a limit symbol on a first image plane representative of one of the signals; and displaying of a bar symbol for each one of the other signals on at least a second image plane, the first and second image planes being superimposed on each other, wherein the limit symbol is positioned in such a way that if one of the bar symbols reaches the limit symbol, the limit symbol positioned on a topmost image plane will at least partially cover one of the bar symbols positioned on the second image plane.

* * * * *